United States Patent
Terry (10) Patent No.: US 7,609,632 B2
(45) Date of Patent: Oct. 27, 2009

(54) SCHEDULING MECHANISM FOR MAC ENTITY

(75) Inventor: Stephen E. Terry, North Port, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/832,678

(22) Filed: Apr. 27, 2004

(65) Prior Publication Data

US 2004/0196799 A1    Oct. 7, 2004

Related U.S. Application Data

(63) Continuation of application No. 09/569,731, filed on May 12, 2000, now Pat. No. 6,738,368.

(51) Int. Cl.
*G08C 15/00* (2006.01)

(52) U.S. Cl. .............. 370/230.1; 370/342; 370/441; 370/537

(58) Field of Classification Search .............. 370/252, 370/253, 352, 353, 230, 230.1, 231, 235, 370/328, 342, 395.4, 468, 479, 535, 537
See application file for complete search history.

(56) References Cited

U.S. PATENT DOCUMENTS

| | | | |
|---|---|---|---|
| 4,630,261 A | 12/1986 | Irvin | |
| 5,278,828 A | 1/1994 | Chao | |
| 5,317,562 A | 5/1994 | Nardin et al. | |
| 5,666,348 A | 9/1997 | Thornberg et al. | |
| 5,729,540 A | 3/1998 | Wegrzyn | |
| 5,742,588 A | 4/1998 | Thornberg et al. | |
| 5,754,541 A | 5/1998 | Glisic et al. | |
| 5,802,310 A | 9/1998 | Rajaraman | |
| 5,838,677 A | 11/1998 | Kozaki et al. | |
| 6,078,568 A | 6/2000 | Wright et al. | |
| 6,091,725 A | 7/2000 | Cheriton et al. | |
| 6,105,070 A | 8/2000 | Gaylord | |
| 6,122,253 A | 9/2000 | Jones | |
| 6,236,646 B1 * | 5/2001 | Beming et al. | 370/335 |
| 6,285,662 B1 | 9/2001 | Watanabe et al. | |
| 6,330,603 B1 | 12/2001 | Seki et al. | |

(Continued)

FOREIGN PATENT DOCUMENTS

EP    430570 A2    6/1991

(Continued)

OTHER PUBLICATIONS

Prasad, Ramjee et al. "An Overview of CDMA Evolution Toward Wideband CDMA." IEEE Communications Surveys, Fourth Quarter 1998. vol. 1, No. 1, pp. 2-29.*

(Continued)

*Primary Examiner*—Donald L Mills
(74) *Attorney, Agent, or Firm*—Volpe and Koenig, P.C.

(57) ABSTRACT

A code division multiple access (CDMA) radio network controller (RNC) comprises a medium access controller-controlling/shared (MAC-c/sh) entity. The MAC-c/sh entity has a scheduling mechanism managing a forward access channel (FACH) resources. The scheduling mechanism schedules data for transfer over the FACH according to priority of the data and the data having an indicator of a priority of the data.

16 Claims, 7 Drawing Sheets

U.S. PATENT DOCUMENTS

| | | | |
|---|---|---|---|
| 6,418,136 | B1 | 7/2002 | Naor et al. |
| 6,421,335 | B1* | 7/2002 | Kilkki et al. ............... 370/342 |
| 6,424,624 | B1 | 7/2002 | Galand et al. |
| 6,496,513 | B1 | 12/2002 | Takamichi |
| 6,507,572 | B1* | 1/2003 | Kumar et al. ............... 370/335 |
| 6,567,420 | B1 | 5/2003 | Tiedemann, Jr. et al. |
| 6,594,238 | B1* | 7/2003 | Wallentin et al. ........... 370/252 |
| 6,674,765 | B1 | 1/2004 | Chuah et al. |

FOREIGN PATENT DOCUMENTS

| | | |
|---|---|---|
| EP | 430570 A2 | 6/1991 |
| EP | 0707386 | 4/1996 |
| EP | 707386 A2 | 4/1996 |
| EP | 877512 A1 | 11/1998 |
| EP | 877512 A2 | 11/1998 |
| EP | 0912015 A2 | 4/1999 |
| EP | 0912015 A2 | 4/1999 |
| EP | 0912015 A3 | 5/1999 |
| EP | 0912015 A3 | 5/1999 |
| EP | 0977393 A1 | 2/2000 |
| EP | 0977393 A1 | 2/2000 |
| JP | H345051 | 2/1991 |
| WO | 9608935 | 3/1996 |
| WO | WO9608935 | 3/1996 |
| WO | 9622666 | 7/1996 |
| WO | 9622666 A1 | 7/1996 |
| WO | 9833349 | 7/1998 |
| WO | WO9833349 | 7/1998 |
| WO | 9847253 | 10/1998 |
| WO | WO9847253 | 10/1998 |
| WO | 9909775 | 2/1999 |
| WO | WO9909775 | 2/1999 |

OTHER PUBLICATIONS

Aldama, Eduardo and Vargas, Cèsar, "Outage Effects on the TCP-Wireless Integration for Data/Voice Services in CDMA Systems Using Multiple Access," Centro de Electrónica y Telecomunicaciones, ITESM Monterrey, Mexico.

Okada, H., Yamazato, T., Katayama, M. and Ogawa, A., "CDMA Unslotted Aloha Systems with Finite Buffers," Ogawa Lab., Dept. of Info. Elec., Graduate School of Eng., Nagoya University, Japan.

Chi-Qing Yang and Alapati V. S. Reddy, "A Taxonomy for Congestion Control Algorithms in Packet Switching Networks", IEEE Network, Jul./Aug. 1995, pp. 34-45.

TS 25.321 V2.0.1 MAC Protocol Specification, TSG-RAN Working Group 2 (Radio Layer 2 and Radio Layer 3), Berlin, Germany, May 25-28, 1999.

Stephen E. Terry, FACH Scheduling, Prioritization and Queue Management, 3GPP TSG-RAN WG2 #4, Berlin, Germany, May 25-28, 1999.

Chao et al., "Queue Management with Multiple Delay and Loss Priorities for ATM Switches," IEEE International Conference on Communications, 1994, ICC 94, SUPERCOMM. New Orleans, LA. May 1-5, 1994, vol. 2, pp. 1184-1189.

Liebeherr et al., "Priority Queue Schedulers with Approximate Sorting in Output-Buffered Switches," IEEE Journal of Selecte Areas in Communications, Charlottesville, VA. Jun. 1999, vol. 17, iss. 6 pp. 1127-1144.

Yang et al., "A Taxonomy for Congestion Control Algorithms in Packet Switching Networks," IEEE Network, Jul./Aug. 1995, pp. 34-35.

TS 25.321 V2.0 MAC Protocol Specification, TSG-RAN Working Group 2 (Radio Layer 2 and Radio Layer 3), Berlin, Germany, May 25-28, 1999.

Terry, Fach Scheduling, Prioritization and Queue Management, 3GPP TSG-RAN WG2 #4, Berlin, Germany, May 25-28, 1999.

Aldama et al, "Outage Effects on the TCP-Wireless Integration for Data/Voice Services in CDMA Systems Using Multiple Access," IEEE 49th Vehicular Technology Conference, May 16-20, 1999, vol. 2, pp. 1717-1721.

Okada et al., "CDMA Unslotted Aloha System with Finite Buffers," IEEE International Universal Personal Communications, Oct. 5-9, 1998, vol. 2, pp. 1143-1147.

TSGW3#n(99)395, "Draft LS to RAN 2, Common Channel Management Over Iur," TSG-RAN Working Group 3 Meeting #3, Nortel Networks, Kawasaki, Japan, Apr. 26-30, 1999.

TSGR3#3(99)289, "Report of [ARC/1] Study Item 'Common Transport Channels (FACH, RACH, DSCH) on Iur'," (Draft), TSG-RAN Working Group 3 (Architecture), Kawasaki, Japan, Apr. 26-30, 1999, pp. 1-5.

TS 25.321 V2.0.0 (Apr. 1999), "MAC Protocol Specification," 3rd Generation Partnership Project (3GPP), Technical Specification Group (TSG) RAN, Working Group 2, 1999.

TSGR#3(99)286, "Report of [ARC/1] Study Item 'Common Transport Channels (FACH, RACH, DSCH) on Iur'," (Draft), TSG-RAN Working Group 3 (Architecture), Kawasaki, Japan, Apr. 26-30, 1999, pp. 1-5.

3G TS 25.425 "Technical Specification Group Radio Access Network; UTRAN I$_{ur}$ Interface User Plane Protocols for Common Transport Channel Data Streams", 3rd Generation Partnership Project, V3.1.0 (Mar. 2000); Release 1999.

3G TS 25.321 Technical Specification Group Radio Access Network; 3rd Generation Partnership Project, V3.3.0 (Mar. 2000); Release 1999.

Okada et al., "CDMA Unslotted Aloha System with Finite Buffers," IEEE International Universal Personal Communications, Oct. 5-9, 1998, vol. 2, pp. 1143-1147.

Prasad et al., "An Overview of CDMA Evolution toward Wideband CDMA," IEEE Communications Surveys, pp. 2-29 (1998).

Terry, Fach Scheduling, Prioritization and Queue Management, 3GPP TSG-RAN WG2 #4, Berlin, Germany, May 25-28, 1999.

Third Generation Partnership Project, "Technical Specification Group Radio Access Network; UTRAN Iur interface user plane protocols for Common Transport Channel data streams,"3GPP TS 25.425 V0.1.0 (Feb. 1999).

Third Generation Partnership Project, "Technical Specification Group Radio Access Network; Radio Resource Control (RRC); Protocol Specification (Release 1999)," 3GPP TS 25.331 V1.0.0 (Apr. 1999).

Third Generation Partnership Project, "Technical Specification Group Radio Access Network; Radio Resource Control (RRC); Protocol Specification (Release 1999)," 3GPP TS 25.331 V3.2.0 (Mar. 2000).

Third Generation Partnership Project, "Technical Specification Group Radio Access Network; MAC Protocol Specification (Release 1999)," 3GPP TS 25.321 V3.3.0 (Mar. 2000).

Third Generation Partnership Project, "Technical Specification Group Radio Access Network; Radio interface protocol architecture (Release 1999)," 3GPP TS 25.301 V3.4.0 (Mar. 2000).

Third Generation Partnership Project, "Technical Specification Group Radio Access Network; Radio interface protocol architecture (Release 1999)," 3GPP TS 25.301 V3.0.0 (Apr. 1999).

Third Generation Partnership Project, "Technical Specification Group Radio Access Network; Radio resource management strategies (Release 1999)," 3GPP TR 25.922 V0.1.1 (Apr. 1999).

Third Generation Partnership Project, "Technical Specification Group Radio Access Network;.Radio resource management strategies (Release 1999)," 3GPP TR 29.922 V3.1.0 (Mar. 2000).

Third Generation Partnership Project, "Technical Specification Group Radio Access Network; UTRAN Overall Description (Release 1999)," 3GPP TS 25.401 V1.0.0 (Apr. 1999).

Third Generation Partnership Project, "Technical Specification Group Radio Access Network; UTRAN Overall Description (Release 1999)," 3GPP TS 25.401 V3.2.0 (Mar. 2000).

TS 25.321 V2.0 MAC Protocol Specification, TSG-RAN Working Group 2 (Radio Layer 2 and Radio Layer 3), Berlin, Germany, May 25-28, 1999.

TS 25.321 V2.0.0 (Apr. 1999), "MAC Protocol Specification," 3$^{rd}$ Generation Partnership Project (3GPP),. Technical Specification Group (TSG) RAN, Working Group 2, 1999.

TSGR3#3(99)286, "Report of [ARC/1] Study Item 'Common Transport Channels (FACH, RACH, DSCH) on Iur,'" (Draft), TSG-RAN Working Group 3 (Architecture), Kawasaki, Japan, Apr 26-30, 1999, pp. 1-5.

TSGW3#n(99)395, "Draft LS to RAN 2, Common Channel Management Over Iur," TSG-RAN Working Group 3 Meeting #3, Nortel Networks, Kawasaki, Japan, Apr. 26-30, 1999.

Yang et al., "A Taxonomy for Congestion Control Algorithms in Packet Switching Networks," IEEE Network, Jul./Aug. 1995, pp. 34-45.

* cited by examiner

FACH Prioritization 72

| Type | Source | Destination | | Class | Suggested Priority |
|---|---|---|---|---|---|
| | | No Iur | Across Iur | | |
| CCCH (Signaling) | RLC | X | X | Mandatory | Medium |
| DCCH (Signaling) | MAC-d | X | X | Best Effort | Medium |
| DTCH (Traffic) | MAC-d | X | X | Best Effort | Low |
| DSCH (Control) | MAC-sh | X | | Mandatory | Highest |
| USCH (Control) | MAC-sh | X | | Mandatory | Highest |
| H-ARQ (Control) | MAC-d | X | X | Mandatory | High |
| H-ARQ (Control) | MAC-sh | X | | Mandatory | Highest |

SCHEDULING MECHANISM FOR MAC ENTITY

CROSS REFERENCE TO RELATED APPLICATION(S)

This application is a continuation of U.S. patent application Ser. No. 09/569,731, filed May 12, 2000 now U.S. Pat. No. 6,738,368, which is incorporated by reference as if fully set forth.

BACKGROUND

The invention generally relates to channels used by multiple users in a wireless code division multiple access spread spectrum system. More specifically, the invention relates to a system and method of prioritizing and controlling the flow of data for common and shared channels in a spread spectrum system.

Figure 1:
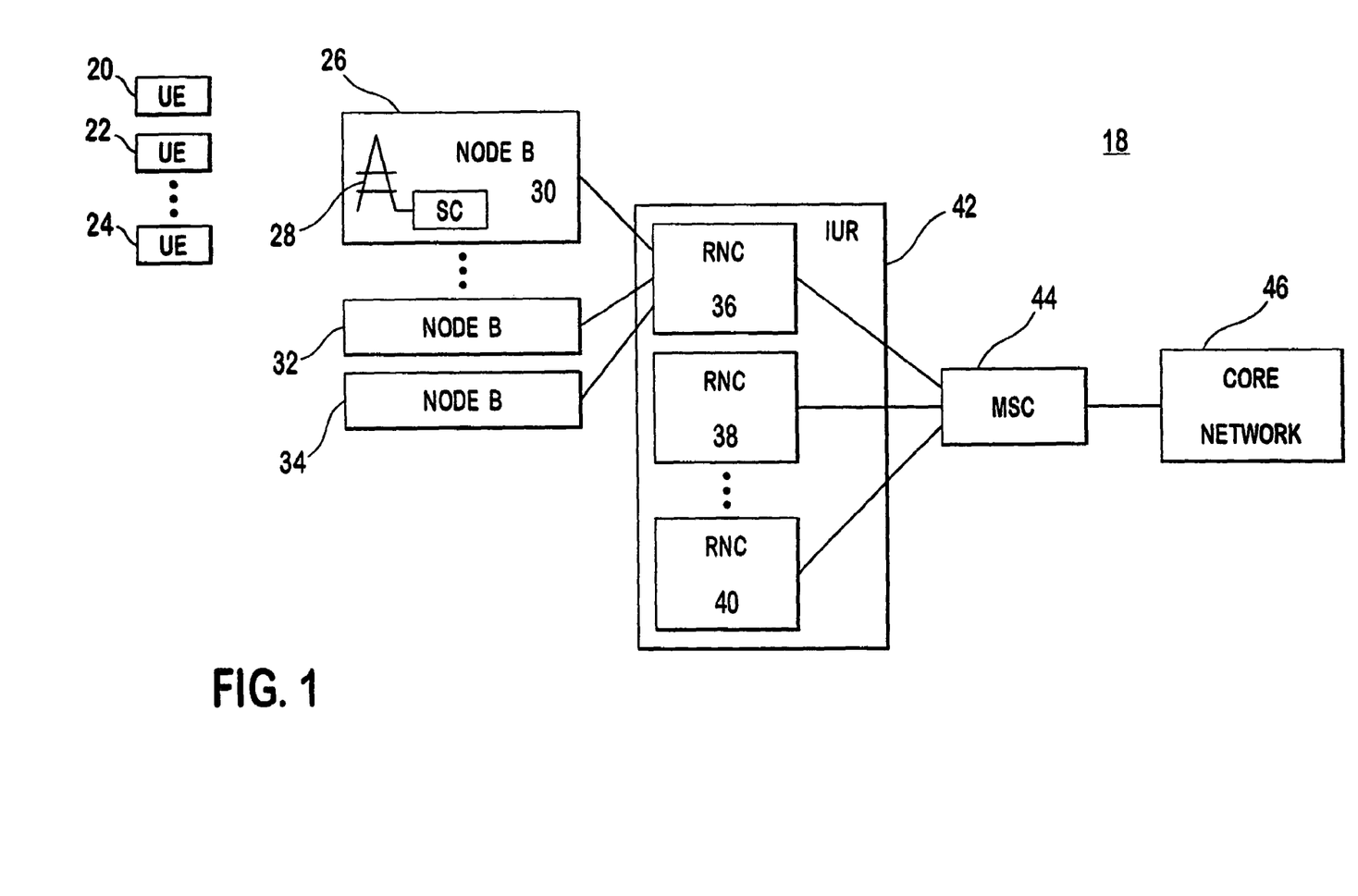
FIG. 1 is a simplified illustration of a wireless spread spectrum communication system.

FIG. 1 illustrates a simplified wireless spread spectrum code division multiple access (CDMA) communication system 18. A node b 26 within the system 18 communicates with associated user equipment 20-24 (UE). The node b 26 has a single site controller (SC) 30 associated with either a single (shown in FIG. 1) or multiple base stations 28. A Group of node bs 26, 32, 34 is connected to a radio network controller (RNC) 36. To transfer communications between RNCs 36-40, an interface between the RNCs (IUR) 42 is utilized. Each RNC 36-40 is connected to a mobile switching center (MSC) 44 which in turn is connected to the core network 46.

To communicate within the system 18, many types of communication channels are used, such as dedicated, shared and common. Dedicated channels transfer data between a node b 26 and a particular UE 20-24. Common and shared channels are used by multiple UEs 20-24 or users. All of these channels carry a variety of data including traffic, control and signaling data.

Figure 2:
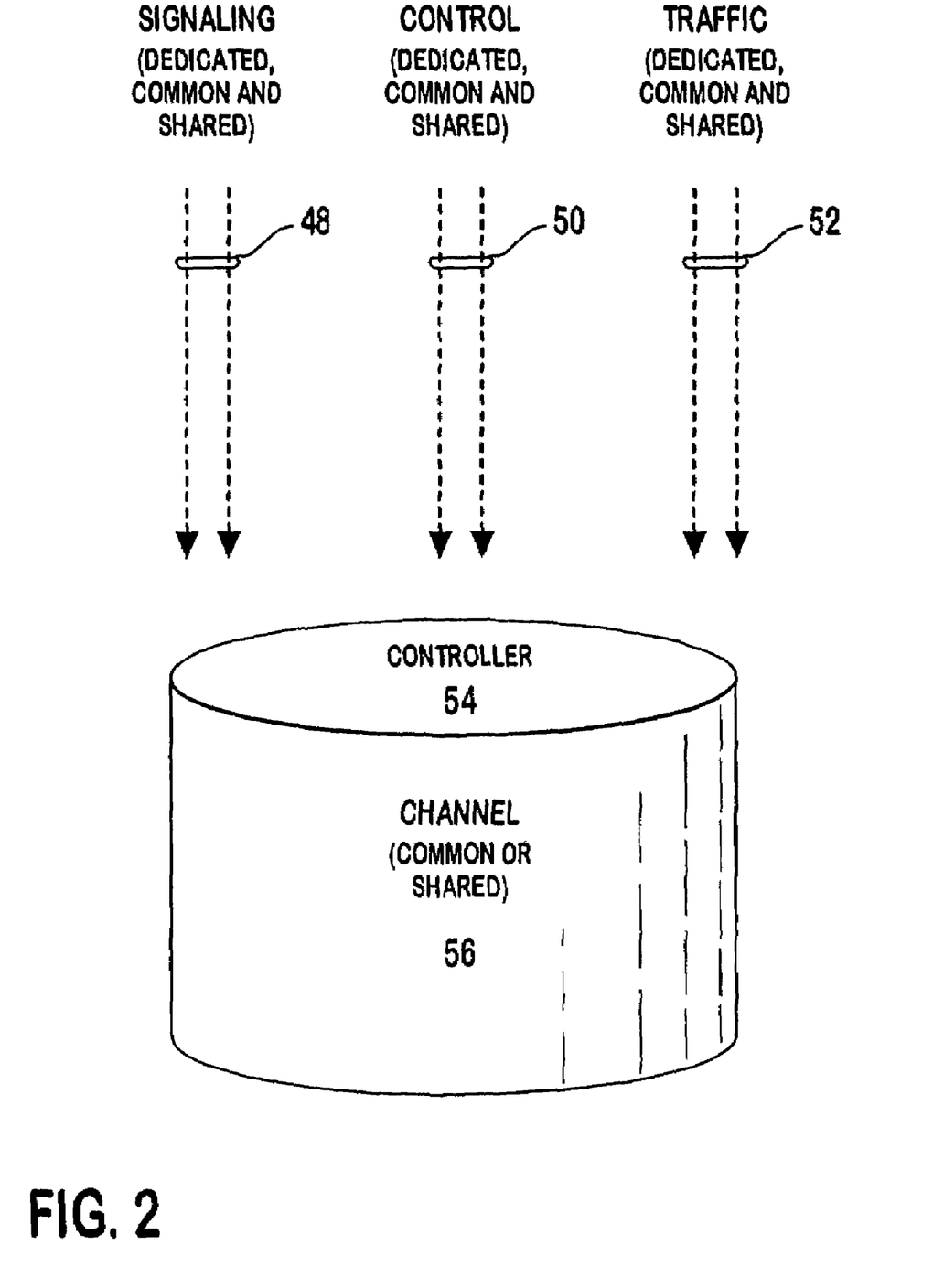
FIG. 2 is an illustration of data flowing into a common or shared channel.

Since shared and common channels carry data for different users, data is sent using protocol data units (PDUs) or packets. As shown in FIG. 2, to regulate the flow of data from differing sources 48-52 into a channel 56, a controller 54 is used.

Figure 3:
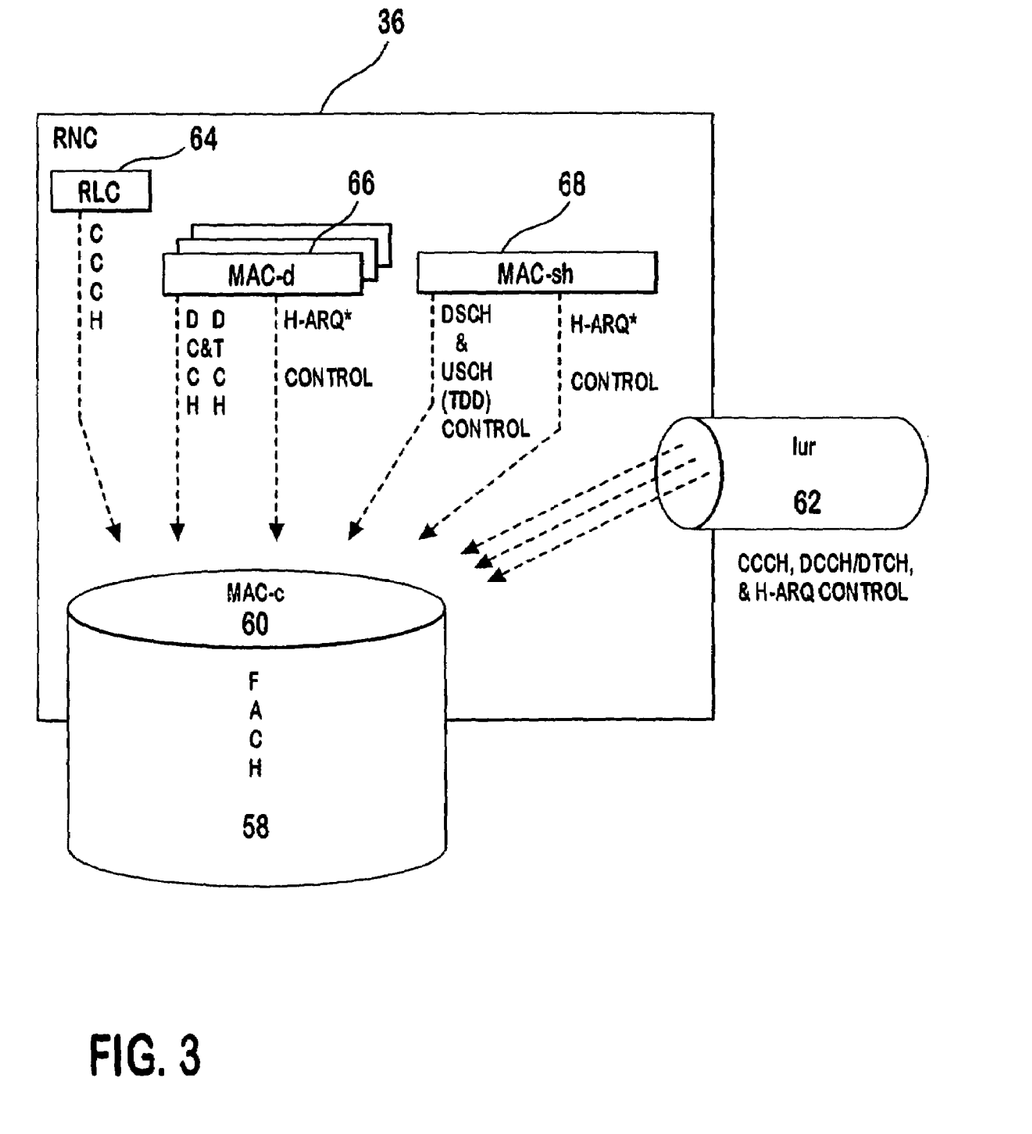
FIG. 3 is an illustration of data flowing into a FACH channel within a RNC.

One common channel used for transmitting data to the UEs 20-24 is the forward access common channel (FACH) 58. As shown in FIG. 3, the FACH 58 originates in a RNC 36 and is sent to a node b 28-34 for wireless transmission as a spread spectrum signal to the UEs 20-24. The FACH 58 carriers several data types from various sources, such as a common control channel (CCCH), dedicated control and traffic channel (DCCH and DTCH), and a downlink and uplink share channel (DSCH and USCH) control signaling. The FACH 58 also carries control signaling out of band, such as hybrid automatic repeat request (H-ARQ), and similar data transmitted via the IUR 62 from other RNCs 38-40, such as CCCH, DCCH, DTCH and H-ARQ control data.

Various controllers are used by the RNC 36 to control the flow of data. A radio link controller (RLC) 64 handles the CCCH. The dedicated medium access controller (MAC-d) 66 handles the DCCH, the DTCH and some out of band H-ARQ signaling. The shared medium access controller (MAC-sh) 68 handles the DSCH, USCH control signaling and out of band H-ARQ control signaling. Controlling the FACH 58 is the common medium access controller (MAC-c) 60.

Due to the multiple sources of data 48-52 that can be transmitted over a common or shared channel, the channel controllers 54 queue the data prior to transmission. If a large backlog develops in the queue, data in the queue develops a latency. A large latency of certain data such as control data will result in the failure of a channel. To alleviate this problem, the prior art either flushed the queue to reduce congestion or rerouted the data. Flushing the queue results in the loss of data and requires retransmission which is undesirable. Rerouting data already queued creates a duplication of data within the system and does not resolve the existing congestion. Accordingly, it is desirable to reduce the latency of data for shared and common channels without the problems associated with the prior art.

SUMMARY

A code division multiple access (CDMA) radio network controller (RNC) comprises a medium access controller-controlling/shared (MAC-c/sh) entity. The MAC-c/sh entity has a scheduling mechanism managing a forward access channel (FACH) resources. The scheduling mechanism schedules data for transfer over the FACH according to priority of the data and the data having an indicator of a priority of the data.

DETAILED DESCRIPTION OF THE PREFERRED EMBODIMENT(S)

Figure 4:
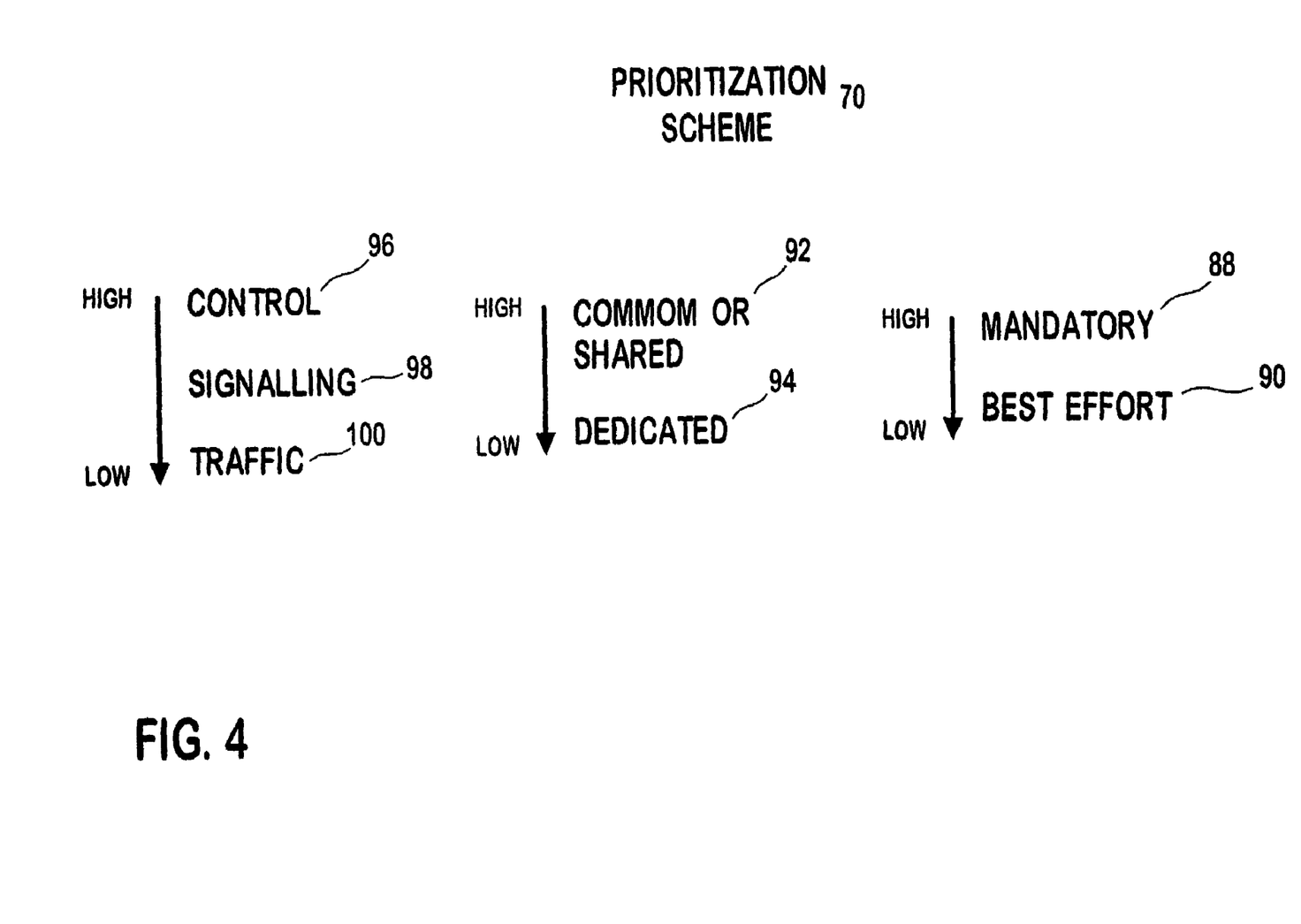
FIG. 4 is an illustration of a prioritization scheme.

Data prioritization 70 is used to reduce data latency in a multiuser channel controller 54 as illustrated in FIG. 4. For a particular common or shared channel, certain data must be transmitted on that channel and is shown in the figure as "mandatory" 88. Other data is preferably sent on the particular channel but may be rerouted to another channel, such as a dedicated channel. This data is referred to as "best effort" 90. Since "mandatory" data 88 is not reroutable, it takes priority over "best effort" data 90.

The type of the data within a packet, such as control 96, signaling 98 and traffic data 100, is also used for prioritization. To accomplish prioritization of the data type, control 96 and signaling 98 data packets are separated from traffic data packets 100. One approach to separating the packets is to group similar data type packets together prior to reception at the controller 54. Alternately, packets sent by each channel prior to reception by the controller 54 are provided with a flag or identifier indicating the packets' data type.

Since a prolonged delay in the transfer of control 96 or signaling 98 data results in a frozen channel, control 96 and signaling 98 data are given a higher priority than traffic data 100. Additionally, data associated with multiple users, common or shared 92, has a higher priority than data for a single user, dedicated 94. The data prioritization scheme is typically stored in the software of the multiuser channel's controller.

During periods of high congestion, data is rerouted to other channels based on its priority 70. For instance, best effort dedicated traffic data is rerouted and mandatory common control data is not. By rerouting data prior to queuing, retransmissions will not be required. Accordingly, the amount of queued data is reduced resulting in lower data latency. Additionally, since the rerouted data is never queued, the duplication of data as experienced in the prior art is eliminated.

Figure 5:
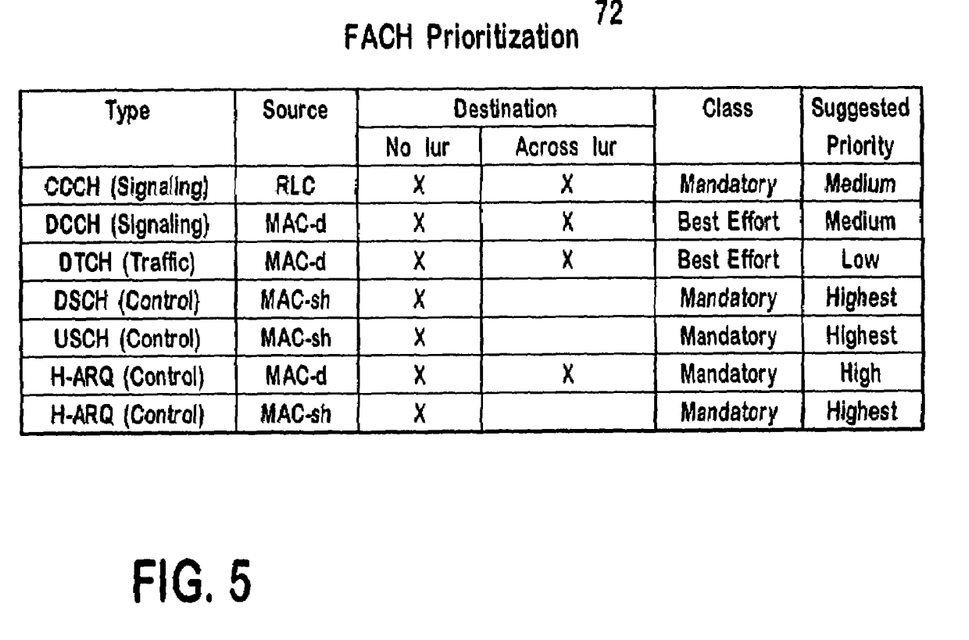
FIG. 5 is a prioritization scheme for use with a FACH channel.

A prioritization scheme 72 for use with a FACH 58 is shown in FIG. 5. Since the DSCH, H-ARQ of the MAC-sh have mandatory shared control data, they have the highest priority, highest. Although the H-ARQ of the MAC-d has mandatory control data, being dedicated it is assigned a slightly lower priority, high. The CCCH and DCCH are used for signaling and have the next level of priority, medium. The lowest level of priority is assigned to the DTCH because it has best effort dedicated traffic data.

To facilitate this prioritization scheme 72 for the FACH 58, modifications to the RNC 36 are required. As shown in FIG. 3, the prior art MAC-d 66 controls the DCCH, DTCH and MAC-d's H-ARQ. As shown in FIG. 5, each of these sources has a different priority. Since this data is multiplexed prior to prioritization at the MAC-d 66, the multiplexer of the MAC-d 66 is moved to the MAC-c 60 to allow prioritization at the MAC-c 60. Alternatively, the MAC-d 66 may send the priority and class (mandatory or best effort), such as by a flag or identifier, of each packet of the multiplexed data for prioritization at the MAC-c 60. The data controlled by the RLC 64 and the MAC-sh 68 have equal priority and accordingly, neither requires modification. Using the stored priority list, the data from the various sources is scheduled for transmission and rerouted during periods of high congestion.

Figure 6:
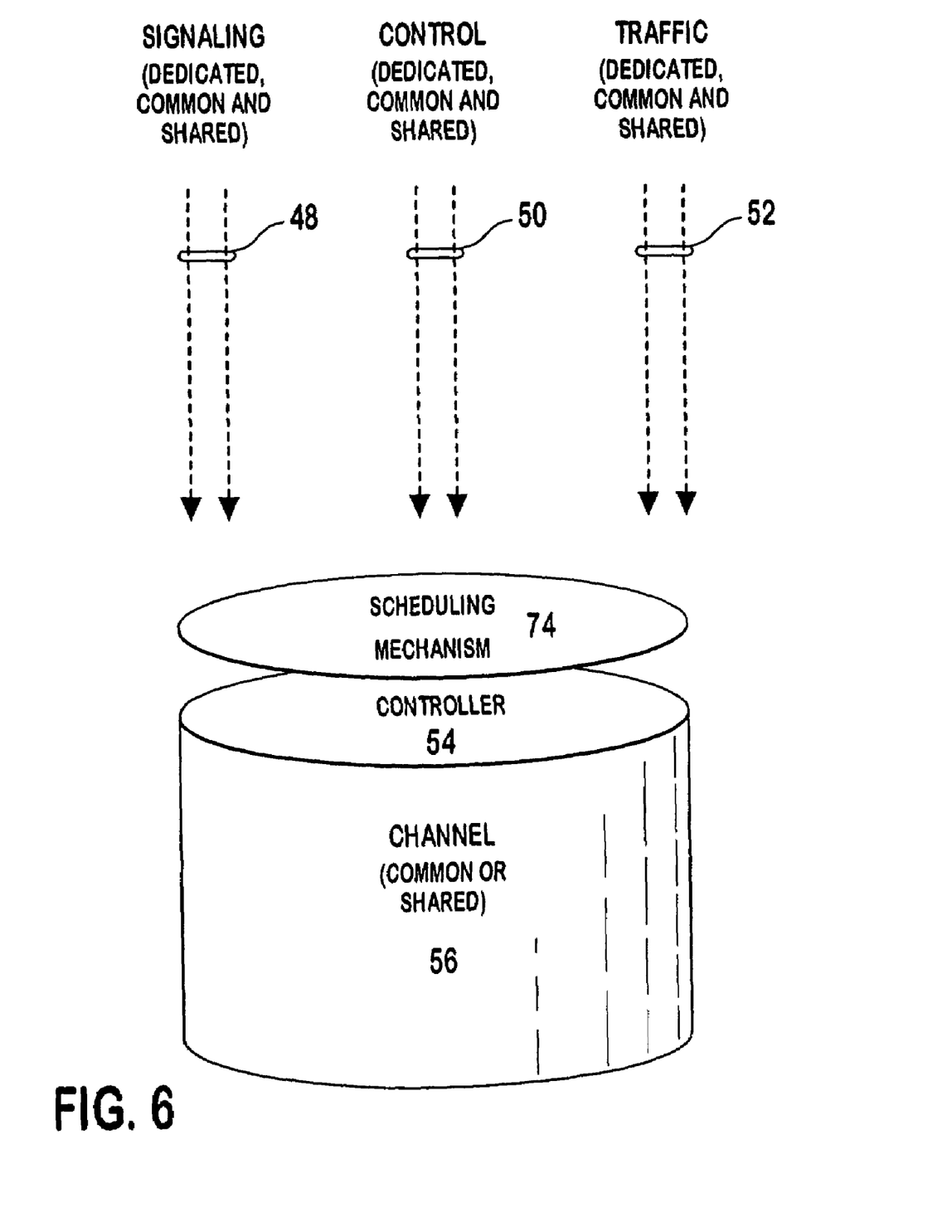
FIG. 6 depicts a reservation mechanism used with a common or shared channel.

Another technique for reducing the latency of data which may be combined with prioritization is to control the flow of data between the various controllers. As shown in FIG. 6, a scheduling mechanism 74 is used to regulate the data entering the common or shared channel 56. The scheduling mechanism 74 tracks the backlog of data in the controller's queue. If the mechanism 74 recognizes congestion and that the data will not be transmitted in a certain period of time, access to the channel 56 limits the flow of data from the individual data sources. The individual sources will recognize the need to reroute data or to not attempt transmission. Using a flow control mechanism with a FACH, MAC and RLC (Layer 2), the latency of signaling is decreased thus increasing efficiency.

Figure 7:
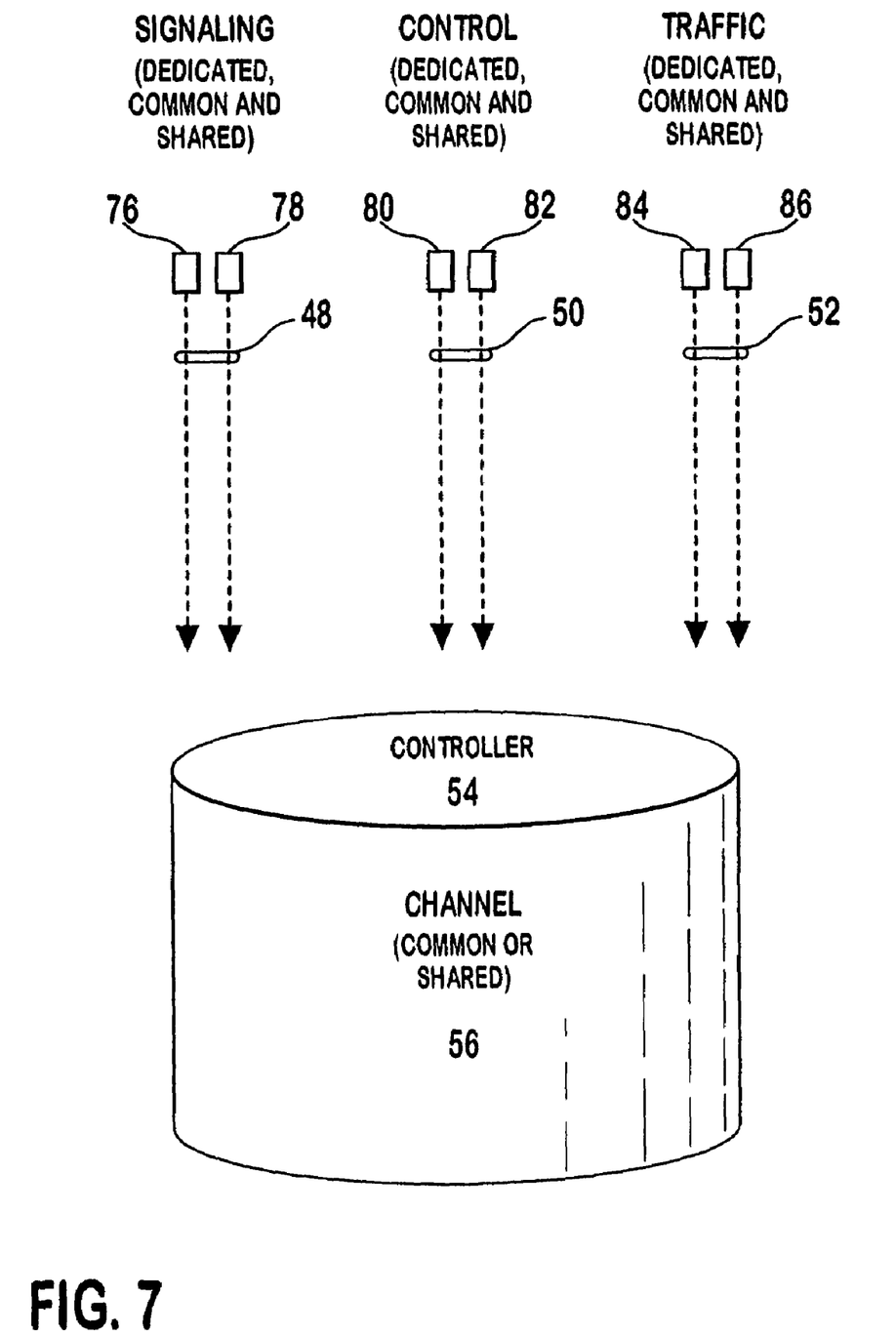
FIG. 7 depicts data source windows used with a common or shared channel.

To prevent the monopolization of the common or shared channel 56 by one data source 48-52 variable windows 76-86 may be used as shown in FIG. 7. Each data source 48-52 has a window or multiple windows 76-86 of outstanding data in the queue that it is permitted. The size of the window 76 is based on the requirements of the specific source. The window 76 is dynamically adjusted in response to the availability of the queue. As the availability of the channel increases, the size of the windows increases which increases the number of outstanding packets. Conversely, as the availability decreases, the size of the windows decreases which decreases the number of outstanding packets. As a result of the decreased windows, the data sources either reroute or stop sending packets to the windows.

What is claimed is:

1. A code division multiple access (CDMA) communication device comprising:
    a first medium access controller (MAC) entity configured to output a first control channel and a dedicated traffic channel (DTCH), the first MAC entity being a MAC-dedicated (MAC-d) entity and the first control channel being a dedicated control channel (DCCH); and
    a second MAC entity configured to generate an access channel, the second MAC entity including:
        a channel multiplexer configured to receive data, the data being carried by the first control channel, the DTCH, and a second control channel, the channel multiplexer also being configured to multiplex the received data;
        a scheduling mechanism configured to receive the multiplexed data and schedule the multiplexed data for transmission on the access channel according to a priority of the received data; and
    a flow control entity configured to limit buffering of a portion of the received data in the second MAC entity, the portion of the received data being associated with the first control channel and the DTCH, wherein the access channel is a forward access channel (FACH).

2. The CDMA communication device of claim 1, wherein the second MAC entity is further configured to limit an amount of the multiplexed data transmitted on the access channel.

3. The CDMA communication device of claim 1, wherein the second MAC entity is further configured to limit a portion of the multiplexed data transmitted on the access channel based on whether the portion of the multiplexed data is associated with the first control channel, the second control channel, or the DTCH.

4. The CDMA communication device of claim 1, wherein a window is associated with each of the first control channel, the second control channel, and the DTCH, the second MAC entity is further configured to limit an amount of the multiplexed data transmitted on the access channel by controlling a size of the window associated with said each of the first control channel, the second control channel, and the DTCH.

5. The CDMA communication device of claim 1, wherein the scheduling mechanism is further configured to schedule the multiplexed data for transmission over a downlink shared channel (DSCH).

6. The CDMA communication device of claim 1, wherein the received data includes an indicator of the priority.

7. The CDMA communication device of claim 1, wherein the communication device is a radio network controller (RNC).

8. The CDMA communication device of claim 1, wherein the scheduling mechanism is configured to supply the access channel to a Node-B, such that the Node-B transmits the access channel to a plurality of user equipments (UEs).

9. A communication method, comprising:
    outputting a first control channel and a dedicated traffic channel (DTCH) with a first medium access controller (MAC) entity, the first MAC entity being a MAC-dedicated (MAC-d) entity, and the first control channel being a dedicated control channel (DCCH);
    receiving the first control channel, the DTCH, and a second control channel, with a channel multiplexer of a second MAC entity, the first control channel, the second control channel, and the DTCH carrying data, and the second MAC entity being configured to output an access channel;
    multiplexing the data with the channel multiplexer; and
    scheduling, with a scheduling mechanism of the second MAC entity, the multiplexed data for transmission on the access channel according to a priority of the multiplexed data; and
    limiting buffering of a portion of the received data in the second MAC entity, the portion of the received data being associated with the first control channel and the DTCH, wherein the access channel is a forward access channel (FACH).

10. The communication method of claim 9, further comprising limiting an amount of the multiplexed data transmitted on the access channel.

11. The communication method of claim 9, further comprising limiting a portion of the multiplexed data transmitted on the access channel based on whether the portion of the multiplexed data is associated with the first control channel, the second control channel, or the DTCH.

12. The communication method of claim 9, wherein a window is associated with each of the first control channel, the second control channel, and the DTCH, the method further comprising limiting an amount of the multiplexed data transmitted on the access channel by controlling a size of the window associated with said each of the first control channel, the second control channel, and the DTCH.

13. The communication method of claim 9, further comprising scheduling the multiplexed data for transmission over a downlink shared channel (DSCH).

14. The communication method of claim 9, wherein the data includes an indicator of the priority.

15. The communication method of claim 9, wherein the communication device is a radio network controller (RNC).

16. The communication method of claim 9, further comprising supplying the access channel to a Node-B, such that the Node-B transmits the access channel to a plurality of user equipments (UEs).

\* \* \* \* \*

UNITED STATES PATENT AND TRADEMARK OFFICE
CERTIFICATE OF CORRECTION

| | |
|---|---|
| PATENT NO. | : 7,609,632 B2 |
| APPLICATION NO. | : 10/832678 |
| DATED | : October 27, 2009 |
| INVENTOR(S) | : Stephen E. Terry |

It is certified that error appears in the above-identified patent and that said Letters Patent is hereby corrected as shown below:

ON THE TITLE PAGE

At Item (56), U.S. PATENT DOCUMENTS, page 1, left column, after line beginning with "5,317,562" insert --5,528,591  6/1996  Lauer et al.--.

At Item (56), U.S. PATENT DOCUMENTS, page 1, left column, after line beginning with "5,838,677" insert --5,872,769  2/1999  Caldara et al.--.

At Item (56), FOREIGN PATENT DOCUMENTS, page 2, left column, after line beginning with "EP 707386 A2" insert --EP   0798943   10/1997--.

At Item (56), FOREIGN PATENT DOCUMENTS, page 2, left column, after line beginning with "WO 9622666 A1" insert --WO   9725825   7/1997--.

At Item (56), OTHER PUBLICATIONS, page 2, left column, on line beginning with "ing in Output-Buffered" after the words "Journal of" delete "Selecte" and insert --Selected--.

IN THE ABSTRACT

At Item (57), ABSTRACT, page 1, right column, line 4, after the words "mechanism managing", delete "a".

IN THE SPECIFICATION

At column 1, line 46, after "FACH 58" delete "carriers" and insert --carries--.

At column 1, line 49, after the word "uplink", delete "share" and insert --shared--.

Signed and Sealed this
Seventh Day of August, 2012

David J. Kappos
*Director of the United States Patent and Trademark Office*